United States Patent
Mizutani et al.

(10) Patent No.: US 12,235,101 B2
(45) Date of Patent: Feb. 25, 2025

(54) METHOD OF TESTING HIDING POWER OF COATING

(71) Applicant: TOYOTA JIDOSHA KABUSHIKI KAISHA, Toyota (JP)

(72) Inventors: Takumi Mizutani, Toyota (JP); Miku Iwasaki, Toyota (JP); Kinichiro Higashi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 628 days.

(21) Appl. No.: 17/522,433

(22) Filed: Nov. 9, 2021

(65) Prior Publication Data
US 2022/0196562 A1    Jun. 23, 2022

(30) Foreign Application Priority Data
Dec. 22, 2020 (JP) .................. 2020-212358

(51) Int. Cl.
*G01B 21/08* (2006.01)
*B05D 1/02* (2006.01)

(52) U.S. Cl.
CPC .............. *G01B 21/08* (2013.01); *B05D 1/02* (2013.01)

(58) Field of Classification Search
None
See application file for complete search history.

(56) References Cited

U.S. PATENT DOCUMENTS

2010/0305902 A1* 12/2010 Prakash ............. G01N 21/8422
702/172
2019/0344309 A1 11/2019 Ono et al.

FOREIGN PATENT DOCUMENTS

| CN | 104345136 A | | 2/2015 | |
|---|---|---|---|---|
| CN | 109444137 A | * | 3/2019 | ........... G01N 1/2813 |
| JP | H04-309434 A | | 11/1992 | |
| JP | H08-224540 A | | 9/1996 | |
| JP | 2009-286862 A | | 12/2009 | |
| JP | 2010-241911 A | | 10/2010 | |
| JP | 2019-195791 A | | 11/2019 | |

* cited by examiner

*Primary Examiner* — Michael P. Rodriguez
(74) *Attorney, Agent, or Firm* — Oliff PLC

(57) ABSTRACT

A method of testing the hiding power of a coating using a plurality of black-and-white hiding testing materials each having a black-and-white pattern includes: arranging the plurality of testing materials side by side spaced substantially equal to each other; applying the coating to the plurality of testing materials, altering the number of times of the coating for each testing material such that film thickness values of the plurality of testing materials is different stepwise; curing the coating applied to the plurality of testing materials; evaluating the black-and-white hiding power of the coating by comparing each of the plurality of testing materials with other of the plurality of testing materials.

4 Claims, 8 Drawing Sheets

METHOD OF TESTING HIDING POWER OF COATING

CROSS-REFERENCE TO RELATED APPLICATIONS

This application claims priority from Japanese patent application P2020-212358 filed on Dec. 22, 2020, the disclosure of which is hereby incorporated in its entirety by reference into this application.

BACKGROUND

Field

The present disclosure relates to a method of testing the hiding power of a coating.

Related Art

A "black-and-white hiding film thickness value" has conventionally been known as an index showing the power of hiding a base as one of characteristics of a coating. The power of hiding the base becomes lower as the black-and-white hiding film thickness value becomes greater, and this power becomes higher as the black-and-white hiding film thickness value becomes smaller. As disclosed in Japanese Patent Application Publication No. 2010-241911, for example, a known method of determining such a black-and-white hiding film thickness value uses a black-and-white hiding testing material having a black-and-white checkered pattern and conforms to the contrast ratio testing method defined in JIS-K 5600-4-1.

The method disclosed in Japanese Patent Application Publication No. 2010-241911 is as follows. According to this method, a material used as the black-and-white hiding testing material is prepared by affixing black-and-white hiding power chart with double-sided adhesive tape to a central portion of a tin plate in a right-left direction. The black-and-white hiding power chart is formed with six sections from top to bottom, the sections except the one at the top are covered with a masking plate so as not to be given a coating, and the coating is spray-applied with a predetermined dry film thickness. Next, the masking plate covering the black-and-white hiding testing material is moved to a next section at a lower position of the black-and-white hiding power chart and then the coating is applied uniformly to the initial section and the newly appearing section. Namely, the coating is applied repeatedly to the section exposed from the first to make this section thicker by a corresponding thickness than the newly appearing section. This operation is repeated in such a manner as to apply the coating to all the six sections while the sections being coated are shifted one by one.

Then, the black-and-white hiding testing material is dried and the resultant black-and-white hiding testing material is inspected visually under an artificial sun lamp. The sections are viewed sequentially in order of decreasing film thickness of the applied coating, a film thickness is measured at a section at a next higher position and having a greater thickness than a section where a boundary between black and white of the black-and-white hiding power chart is slightly seen through, and the measured film thickness is determined to be the black-and-white hiding film thickness value.

According to the method disclosed in Japanese Patent Application Publication No. 2010-241911, however, the coating is applied sequentially to stepped surfaces resulting from shifting and coating the sections of the chart one by one in one chart. this causes a problem that it becomes hard to apply the coating uniformly and accurately to cause difficulty in making high-accurate quality evaluation. In the case of a coating with high hiding power of recent years, even a slight film thickness level difference is required in evaluation process to make the foregoing problem notable.

SUMMARY

According to one aspect of the present disclosure, a method of testing the hiding power of a coating is provided. This method of testing the hiding power of the coating uses a plurality of black-and-white hiding testing materials each having a black-and-white pattern. The method includes: applying the coating to the plurality of black-and-white hiding testing materials without the applied coating in which the number of times of the coating is changed depending on the black-and-white hiding testing materials so as to achieve target film thickness values differing stepwise; curing the coating applied to the plurality of black-and-white hiding testing materials; and evaluating the black-and-white hiding power of the coating by comparing the plurality of black-and-white hiding testing materials with each other obtained by the curing.

DETAILED DESCRIPTION

A. First Embodiment

A method of testing the hiding power of a coating according to a first embodiment of the present disclosure will be described by referring to FIGS. 1 to 6. A "black-and-white hiding film thickness value" is recognized as an index showing the power of hiding a base as one of characteristics of a coating. According to the method of testing hiding power of the present embodiment, a black-and-white hiding film thickness value is determined for a coating to be tested, and it is judged whether the determined black-and-white hiding film thickness value conforms to a black-and-white hiding film thickness value defined in advance for this coating under a certain condition. A plurality of black-and-white hiding testing materials is used in determining the black-and-white hiding film thickness value.

Figure 1:
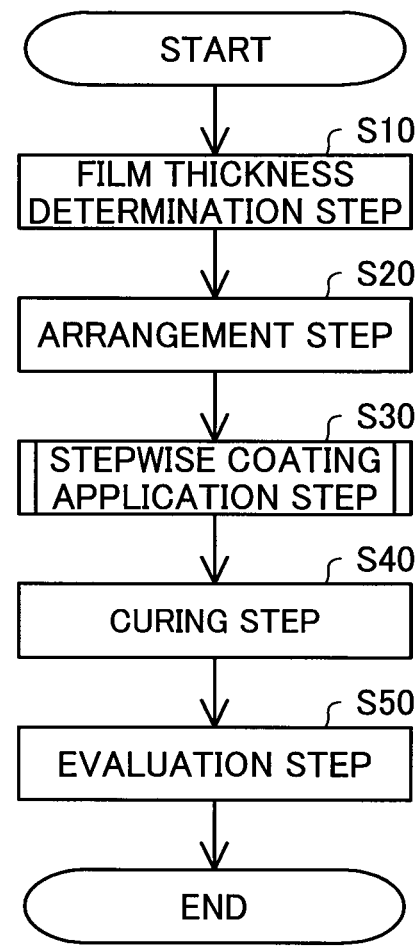
FIG. 1 is a main flowchart explaining a method of testing the hiding power of a coating according to a first embodiment of the present disclosure.
Figure 2:
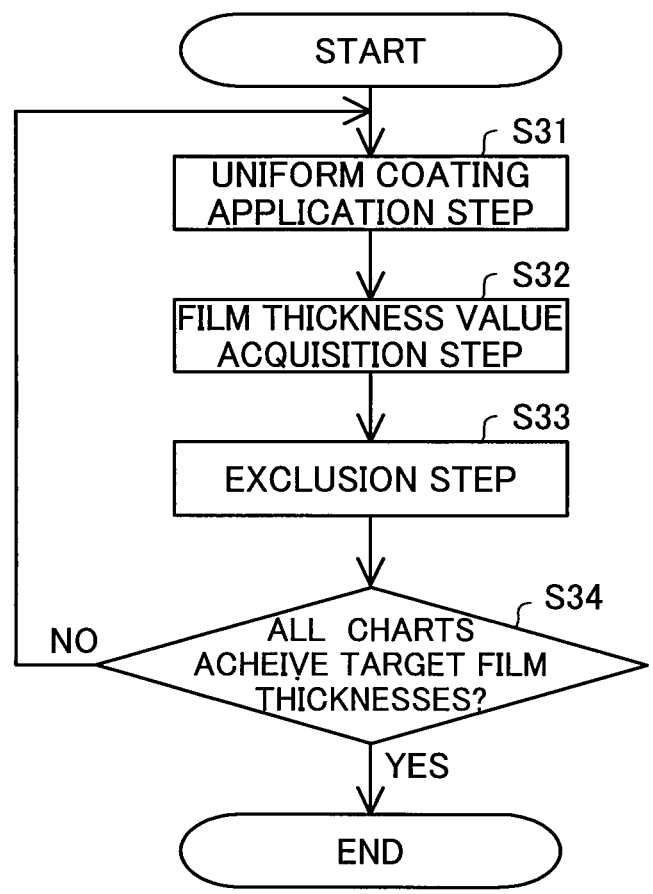
FIG. 2 is a flowchart explaining a stepwise coating application step.

FIG. 1 is a main flowchart explaining the method of testing the hiding power of a coating according to the first embodiment of the present disclosure. FIG. 2 is a flowchart explaining a stepwise coating application step. FIGS. 3 to 6 are schematic views for explaining a corresponding step of the method of testing the hiding power of a coating.

Black-and-white hiding testing materials 11, 12, 13, 14, and 15 used in the method of testing hiding power will be described first. As shown in FIGS. 3 to 6, a configuration is common among the plurality of (in the present embodiment, five) black-and-white hiding testing materials 11, 12, 13, 14, and 15 used in the method of testing hiding power of the present embodiment. In each of FIGS. 3 to 6, regarding constituting elements of each of the black-and-white hiding testing materials 11, 12, 13, 14, and 15 described in detail below, reference signs are given to these constituting elements of only the first black-and-white hiding testing material 11 or the second black-and-white hiding testing material 12 and for the other black-and-white hiding testing materials 13 to 15, reference signs to these constituting elements are omitted.

Figure 3:
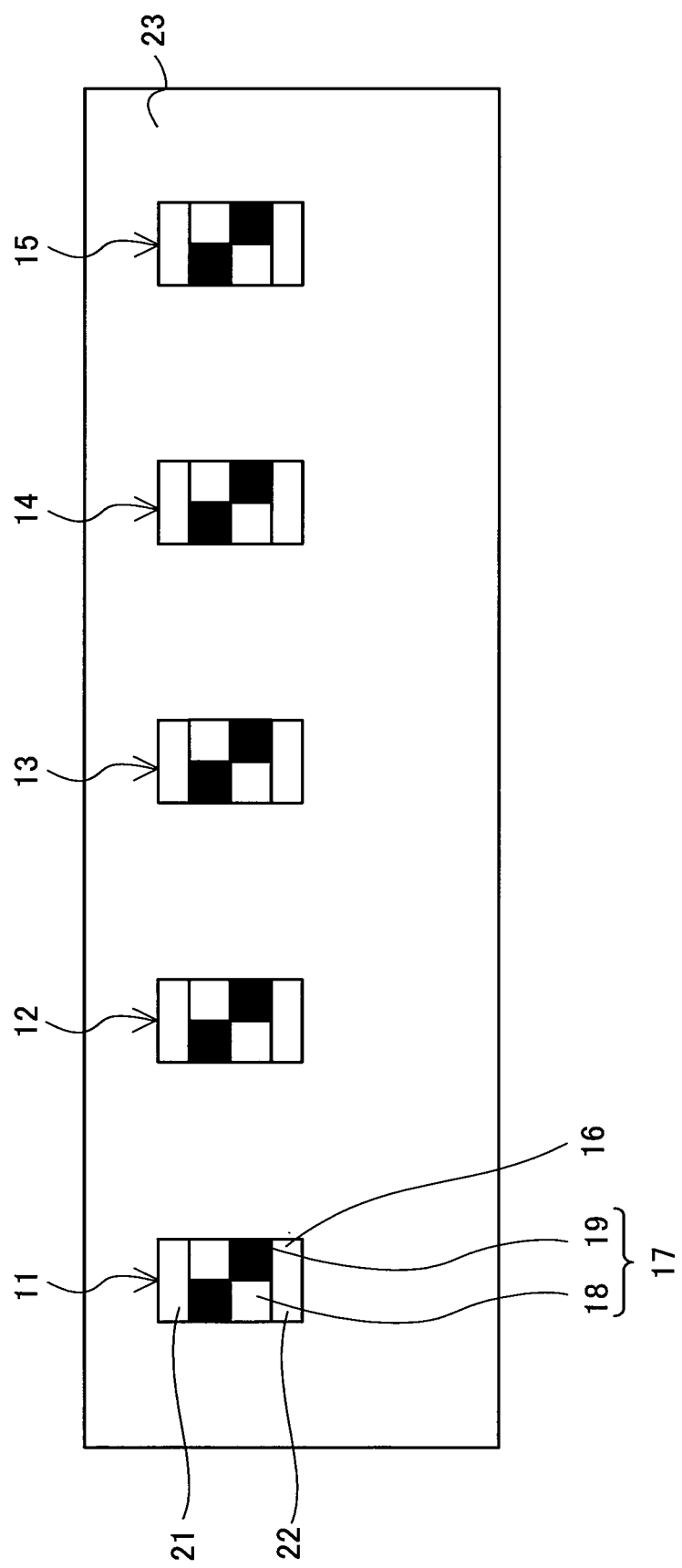
FIG. 3 is a schematic view for explaining an arrangement step.

As shown in FIG. 3, each of the black-and-white hiding testing materials 11, 12, 13, 14, and 15 includes a tin plate 16 and black-and-white hiding power chart 17. The tin plate 16 has a rectangular shape in a plan view and is arranged in such a manner that the long sides thereof conform to a top-bottom direction. The breadth of the tin plate 16 and the breadth of the black-and-white hiding power chart 17 are substantially equal to each other. The black-and-white hiding power chart 17 is given a printed black-and-white checkered pattern as a black-and-white pattern.

The black-and-white hiding power chart 17 of the present embodiment includes white cell sections 18 and black cell sections 19 both having square shapes arranged alternately in a two cells by two cells layout as a whole. Each of the cell sections 18 and 19 has one side of a length of about 50 mm. Regarding lightness, it is equal to or greater than L value of 90 in the white cell section 18 and is equal to or less than L value of 12 in a black section. The white cell section 18 corresponds to a "white section," and the black cell section 19 corresponds to a "black section." The black-and-white hiding power chart 17 is affixed to a central portion of the tin plate 16 in the top-bottom direction. The upper and lower end portions of the tin plate 16 are provided with upper empty space 21 and lower empty space 22 respectively where the black-and-white hiding power chart 17 is not affixed.

Described next is a method of testing the hiding power of a coating using the above-described black-and-white hiding testing materials 11, 12, 13, 14, and 15. In the present embodiment, a coating to be evaluated is a coating conforming to a standard for a black-and-white hiding film thickness value of 1.0 μm plus or minus 0.2 μm. Specifically, a median of the standard is 1.0 μm, a permissible lower limit value of the standard is 0.8 μm, and a permissible upper limit value of the standard is 1.2 μm.

As shown in FIG. 1, the method of testing the hiding power includes a film thickness determination step S10, an arrangement step S20, a stepwise coating application step S30, a curing step S40, and an evaluation step S50. In the film thickness determination step S10, respective target film thickness values differing stepwise with an equal interval are determined for the black-and-white hiding testing materials 11, 12, 13, 14, and 15. In the present embodiment, as a standard for the black-and-white hiding film thickness value is 1.0 μm plus or minus 0.2 μm, the respective target film thickness values for the black-and-white hiding testing materials 11, 12, 13, 14, and 15 are set at intervals of 0.2 μm. The thickness of 0.2 μm corresponding to a difference between the respective target film thickness values of the black-and-white hiding testing materials 11, 12, 13, 14, and 15 means what is called a "film thickness level difference."

The target film thickness value of the first black-and-white hiding testing material 11 is set to 0.6 μm still less than the permissible lower limit value by the film thickness level difference. The target film thickness value of the second black-and-white hiding testing material 12 is set to 0.8 μm corresponding to the permissible lower limit value. The target film thickness value of the third black-and-white hiding testing material 13 is set to 1.0 μm corresponding to the median. The target film thickness value of the fourth black-and-white hiding testing material 14 is set to 1.2 μm corresponding to the permissible upper limit value. The target film thickness value of the fifth black-and-white hiding testing material 15 is set to 1.4 μm still greater than the permissible upper limit value by the film thickness level difference.

FIG. 3 is a schematic view explaining the arrangement step S20, which is a view taken from the front showing a state in which the arrangement of all the black-and-white hiding testing materials 11, 12, 13, 14, and 15 is finished. As shown in FIG. 3, in the arrangement step S20, the black-and-white hiding testing materials 11, 12, 13, 14, and 15 are arranged on a flat base plate 23 in such a manner that coated surfaces are located on the same plane. The base plate 23 is a steel plate made of tin, for example, and is fixed with a magnet to a base not shown in the drawings. The five black-and-white hiding testing materials 11, 12, 13, 14, and 15 are arranged on the base plate 23 side by side at intervals substantially equal to each other in order from one side (from the left side of FIG. 3).

FIG. 2 is a flowchart explaining the stepwise coating application step S30. In the stepwise coating application step S30, the coating is applied to the black-and-white hiding testing materials 11, 12, 13, 14, and 15 without the applied coating in which the number of times of the coating is changed stepwise depending on the black-and-white hiding testing materials 11, 12, 13, 14, and 15. This results in the film thickness level difference that makes the respective thicknesses of coating films on the black-and-white hiding testing materials 11, 12, 13, 14, and 15 differ stepwise from each other at an equal interval.

As shown in FIG. 2, the stepwise coating application step S30 includes a uniform coating application step S31, a film thickness value acquisition step S32, and an exclusion step S33. In the present embodiment, the uniform coating application step S31 is performed several times (in the present embodiment, seven times), as will be described later. In the uniform coating application step S31, the coating is applied with a uniform thickness to the black-and-white hiding testing material 11, 12, 13, 14, or 15 as an object at which a before-curing film thickness value showing the thickness of a coating film on this black-and-white hiding testing material 11, 12, 13, 14, or 15 before implementation of the curing step does not conform to its target film thickness value on a before-curing basis. Being "uniform" has a wide meaning covering not only a state with no error but also a state with an error of less than 5% between the coating films.

The above-described "target film thickness value" means the film thickness value of the coating after being subjected to the curing step S40 described later. The above-described "target film thickness value on a before-curing basis" means the film thickness value of the coating before curing expected to become the above-described target film thickness value after being subjected to the curing step S40. In the following description, in comparing the "before-curing film thickness value" and the "target film thickness value" of the black-and-white hiding testing material, the "target film thickness value" means the "target film thickness value on a before-curing basis."

A "value corresponding to the target film thickness value" is the "target film thickness value itself" when the "target film thickness value" is considered as a value before curing, and is a "before-curing film thickness value obtained by dividing the target film thickness value by a heating residue" when the "target film thickness value" is considered as a value after curing. Here, "corresponding to the target film thickness value" is not limited to full conformity in a numerically strict sense between the "before-curing film thickness value" and the "target film thickness value" but such correspondence is considered to be achieved as long as these film thickness values have equality in a range in which they are generally judged to be equal to each other in consideration of technical knowledge in the pertinent technical field.

Figure 4:
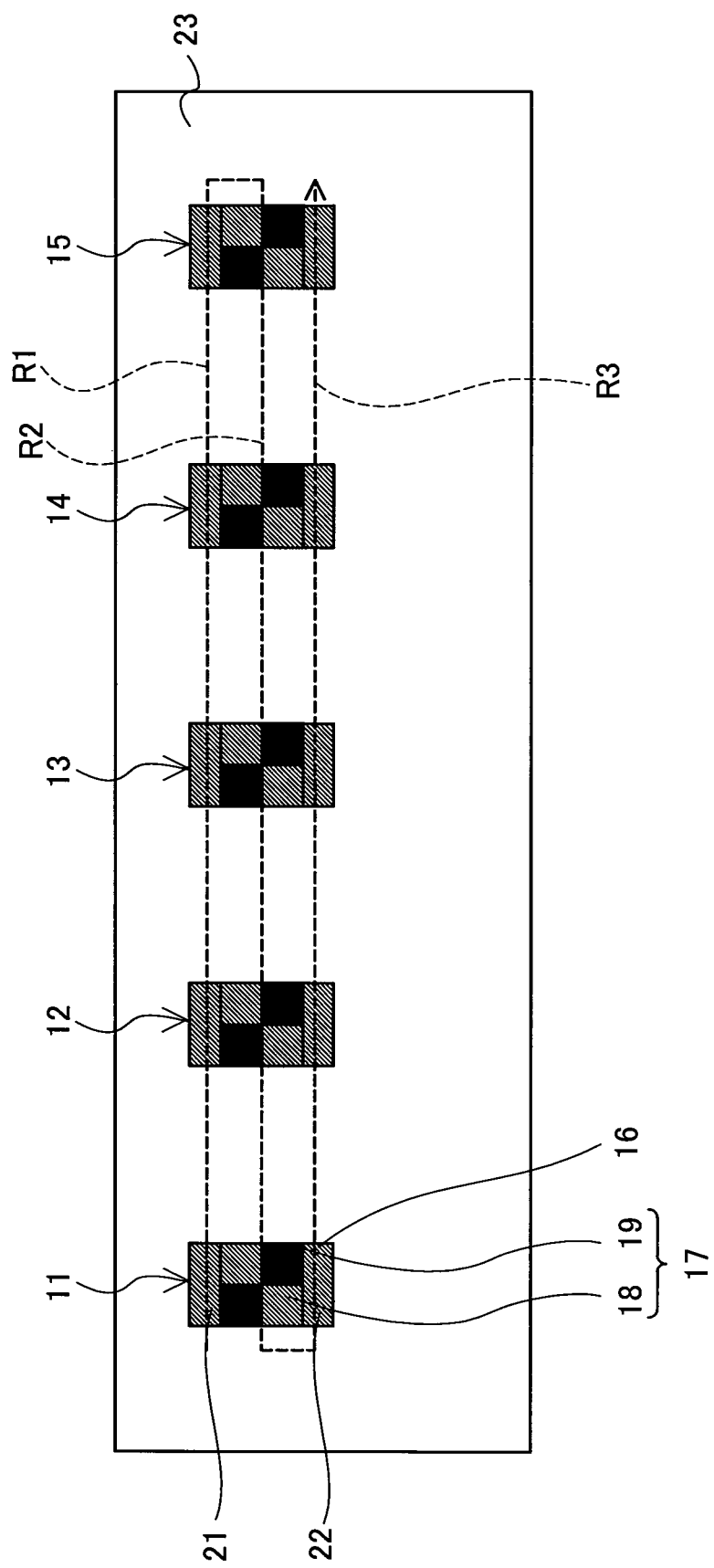
FIGS. 4 and 5 are schematic views for explaining the stepwise coating application step.

FIG. 4 is a schematic view explaining the uniform coating application step S31 and showing how all the five black-and-white hiding testing materials 11, 12, 13, 14, and 15 are coated. The uniform coating application is performed manually as spray coating application using a well-known spray gun. An air pressure and an ejection amount for the spray gun, and a pattern width (vertical width of the coating formed into an oval shape through spraying of the coating) are set to respective values in such a manner as to achieve a coating application thickness of 0.2 µm through one spray injection. The numerical value of 0.2 µm mentioned herein is an after-curing film thickness value. During spray coating, a before-curing film thickness value showing a film thickness value during the coating application is set by giving consideration to a heating residue of the coating. If the heating residue of the coating of the present embodiment is 3.5%, for example, a coating film of 0.2 µm in terms of an after-curing film thickness value has a before-curing film thickness value of about 6 µm. The heating residue is the ratio of a solid remaining as a coating film after baking of the coating and is determined in advance by a test conducted beforehand.

In FIG. 4, coating application routes R1, R2, and R3 using the spray gun are indicated by a dashed line arrow. In the present embodiment, as indicated by the coating application routes R1, R2, and R3, the entire surface of each of the black-and-white hiding testing materials 11, 12, 13, 14, and 15 is coated separately in three parts defined by the upper route R1, the intermediate route R2, and the lower route R3. More specifically, as indicated by the upper route R1, an operator applies the coating by shooting the spray gun while pointing the spray gun to a position corresponding to the upper empty space 21 of the first black-and-white hiding testing material 11, sliding the spray gun sideway toward the second black-and-white hiding testing material 12, and shooting the spray gun to the respective upper parts of the black-and-white hiding testing materials 12, 13, 14, and 15 sequentially. During this process, the coating is applied to the upper part of each of the black-and-white hiding testing materials 11, 12, 13, 14, and 15, namely, to an area mainly covering the upper empty space 21 and the upper section of the checkered pattern.

When the operator finishes the coating application of the upper part of the fifth black-and-white hiding testing material 15, the operator shifts a target position of the spray gun downward by about one cell. As indicated by the intermediate route R2, the operator then performs spray coating application sequentially while moving the spray gun sideway from the fifth black-and-white hiding testing material 15 toward the first black-and-white hiding testing material 11. During this process, the coating is applied to the intermediate part of each of the black-and-white hiding testing materials 11, 12, 13, 14, and 15, namely, mainly across the upper section and the lower section of the checkered pattern.

Finally, the operator further shifts a target position of the spray gun downward by about one cell, and shoots the spray gun while pointing the spray gun to a position corresponding to the lower empty space 22 of the first black-and-white hiding testing material 11. As indicated by the lower route R3, like in the coating application along the upper route R1, the operator moves the spray gun sideway toward the second black-and-white hiding testing material 12 and performs coating application sequentially to the lower empty space 22 of the fifth black-and-white hiding testing material 15. During this process, the coating is applied to the lower part of each of the black-and-white hiding testing materials 11, 12, 13, 14, and 15, namely, mainly across the lower section of the checkered pattern and the lower empty space 22. The coating is applied in such a manner that the pattern widths overlap each other vertically. Furthermore, the spray gun is always pointed at a right angle to a coating surface. As a result, all the black-and-white hiding testing materials 11, 12, 13, 14, and 15 as coating objects are coated uniformly.

As described above, the three coating application routes R1, R2, and R3 at the different height positions are provided for the reason of reducing the occurrence of fluctuation in thickness in the white cell section 18 and the black cell section 19 resulting from the feature of the spray gun that the coating is injected to a smaller amount in an end portion of an injection area than in a central portion of the injection area.

Referring again to FIG. 2, the film thickness value acquisition step S32 performed after the uniform coating application step S31 includes a thickness measurement step of measuring the before-curing film thickness value of each of the black-and-white hiding testing materials 11, 12, 13, 14, and 15. In the thickness measurement step, the thickness of a coating film before being baked is measured using a rotary wet gauge, for example. At this time, a before-curing thickness is measured at the upper empty space 21 or the lower empty space 22 so as not to leave a measurement mark on the black-and-white pattern. After one implementation of the uniform coating application step S31, an after-curing film thickness value is to be 0.2 µm (6 µm in terms of a before-curing film thickness value), and whether this thickness is obtained exactly is determined on the basis of a measured value from the wet gauge.

At this time, if the thickness of the coating film considerably differs from the target film thickness value, the coating is applied again. If the thickness of the coating film is less than the target thickness, for example, the coating is applied again over the coating film. If the thickness of the coating film is greater than the target thickness, the coating film is wiped off completely to allow the uniform coating application step S31 to be performed again. An after-curing film thickness value required later for evaluation is calculated by multiplying a measured value from the wet gauge indicating a before-curing film thickness value by a heating residue determined in advance for the coating.

In the exclusion step S33 performed after the film thickness value acquisition step S32, the black-and-white hiding testing material 11, 12, 13, 14, or 15 having a before-curing film thickness value on a before-curing basis conforming to a target film thickness value is excluded from an object of next implementation of the coating application step. More specifically, the black-and-white hiding testing material 11, 12, 13, 14, or 15 with a coating film having the target film thickness value is removed from the base plate 23. As described above, however, the lower limit target film thickness value determined according to a standard for a black-and-white hiding thickness is 0.6 μm and the coating corresponding only to 0.2 μm is applied in a first round of the routine shown in FIG. 2. Thus, none of the black-and-white hiding testing materials 11, 12, 13, 14, and 15 has a coating film achieving the target film thickness value. For this reason, none of the black-and-white hiding testing materials 11, 12, 13, 14, and 15 is removed in the first round.

After completion of the exclusion step S33, it is judged whether all the black-and-white hiding testing materials 11, 12, 13, 14, and 15 have reached their target film thickness values (step S34). If all the black-and-white hiding testing materials 11, 12, 13, 14, and 15 are judged not to have reached their target film thickness values, in other words, if one or more black-and-white hiding testing materials are judged to have thicknesses not conforming to their target film thickness values (step S34: NO), the processing returns to the step S31 and then the steps S31 to S34 are performed again. On the other hand, if all the black-and-white hiding testing materials 11, 12, 13, 14, and 15 are judged to have reached their target film thickness values (step S34: YES), the stepwise coating application step S30 is finished. In the present embodiment, the above-described step S34 is realized by judging whether the film thickness acquired by the implementation of the step S32 conforms to the target film thickness value.

As none of the black-and-white hiding testing materials 11, 12, 13, 14, and 15 has a coating film achieving the target film thickness value (S34: NO) after implementation of the exclusion step S33 in the first round, the uniform coating application step S31 is performed again for the second time. Unless the coating is applied again for reason such as the above-described fluctuation in measured value, all the coating films on the black-and-white hiding testing materials 11, 12, 13, 14, and 15 have the target film thickness value (0.6 μm) set for the first black-and-white hiding testing material 11 in a third round of the routine shown in FIG. 2. Then, if the actual film thickness acquired in the film thickness value acquisition step S32 conforms to the target film thickness value, the first black-and-white hiding testing material 11 is removed from the base plate 23.

Figure 5:
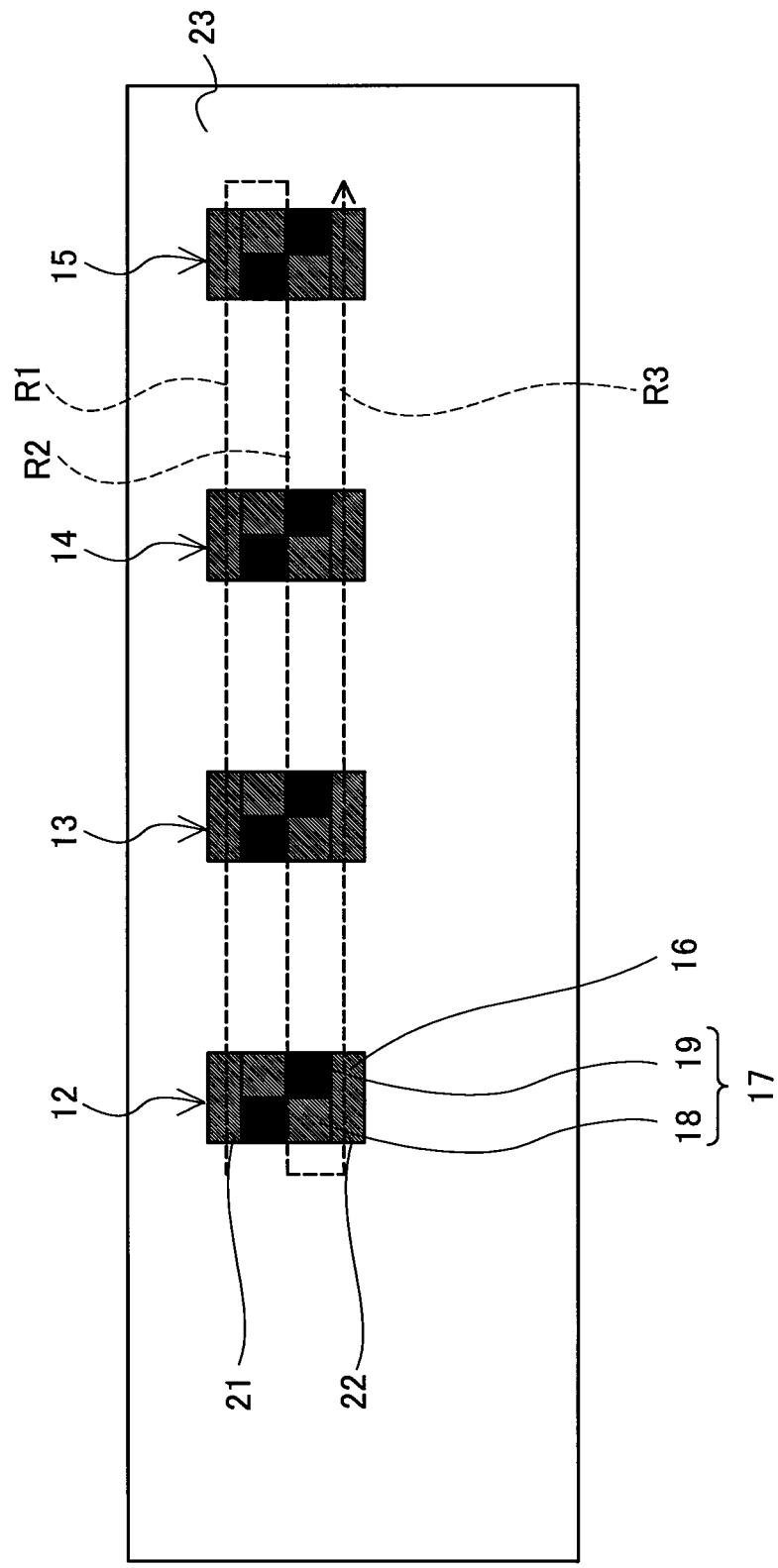

In the uniform coating application step S31 in a fourth round, the coating is applied to coating objects that are black-and-white hiding testing materials (second black-and-white hiding testing material 12 to fifth black-and-white hiding testing material 15) other than the first black-and-white hiding testing material 11. FIG. 5 shows a state after the first black-and-white hiding testing material 11 is removed from the base plate 23 and excluded from a coating object and shows how coating objects from the second black-and-white hiding testing material 12 to the fifth black-and-white hiding testing material 15 are subjected to uniform coating application for the fourth time. This uniform coating application is performed by the same method as the method employed for the first round including use of the routes R1, R2, and R3 for the spray gun, except that the coating is applied to objects from the second black-and-white hiding testing material 12 to the fifth black-and-white hiding testing material 15.

As described above, the uniform coating application step S31, the film thickness value acquisition step S32, and the exclusion step S33 are performed several times (in the present embodiment, seven times) until the coating films on all the black-and-white hiding testing materials 11, 12, 13, 14, and 15 achieve their target film thickness values. Specifically, the number of times the uniform coating application step S31 is performed is three for the first black-and-white hiding testing material 11, four for the second black-and-white hiding testing material 12, five for the third black-and-white hiding testing material 13, sixth for the fourth black-and-white hiding testing material 14, and seven for the fifth black-and-white hiding testing material 15.

Referring again to FIG. 1, in the curing step S40 performed after the stepwise coating application step S30 is finished, the coating on the black-and-white hiding testing materials 11, 12, 13, 14, and 15 is cured by baking. More specifically, the coating is set at ordinary temperature for ten minutes, then preheated at 80° C. for 10 minutes, and then dried further at 110° C. for 15 minutes.

Next, in the evaluation step S50, the resultant black-and-white hiding testing materials 11, 12, 13, 14, and 15 are evaluated. In the evaluation step S50, the black-and-white hiding testing materials 11, 12, 13, 14, and 15 obtained in the curing step S40 are compared with each other to evaluate the black-and-white hiding power of the coating. This will be described in more detail. In the evaluation step S50, the black-and-white hiding testing materials 11, 12, 13, 14, and 15 having thicknesses differing stepwise are compared in order of thickness, two of the black-and-white hiding testing materials are compared with each other between which target film thickness values are at levels next to each other, and a critical black-and-white hiding testing material is identified at which a boundary between the white cell section 18 and the black cell section 19 in the black-and-white pattern is invisible. Then, the after-curing film thickness value of the identified black-and-white hiding testing material is determined to be an evaluation result. More specifically, the black-and-white hiding testing materials are examined at a temperature of 23° C. plus or minus 2° C., at a humidity of 50% RH plus or minus 5% RH, at a brightness from 2000 to 4000 lux under a standard light source device, at an angle of 45 degrees to the front, and from a distance from 250 to 300 mm. Regarding "being compared in order of thickness," the black-and-white hiding testing materials may be examined from the first black-and-white hiding testing material 11 of a small target film thickness value, or conversely, from the fifth black-and-white hiding testing material 15 of a large target film thickness value.

Figure 6:
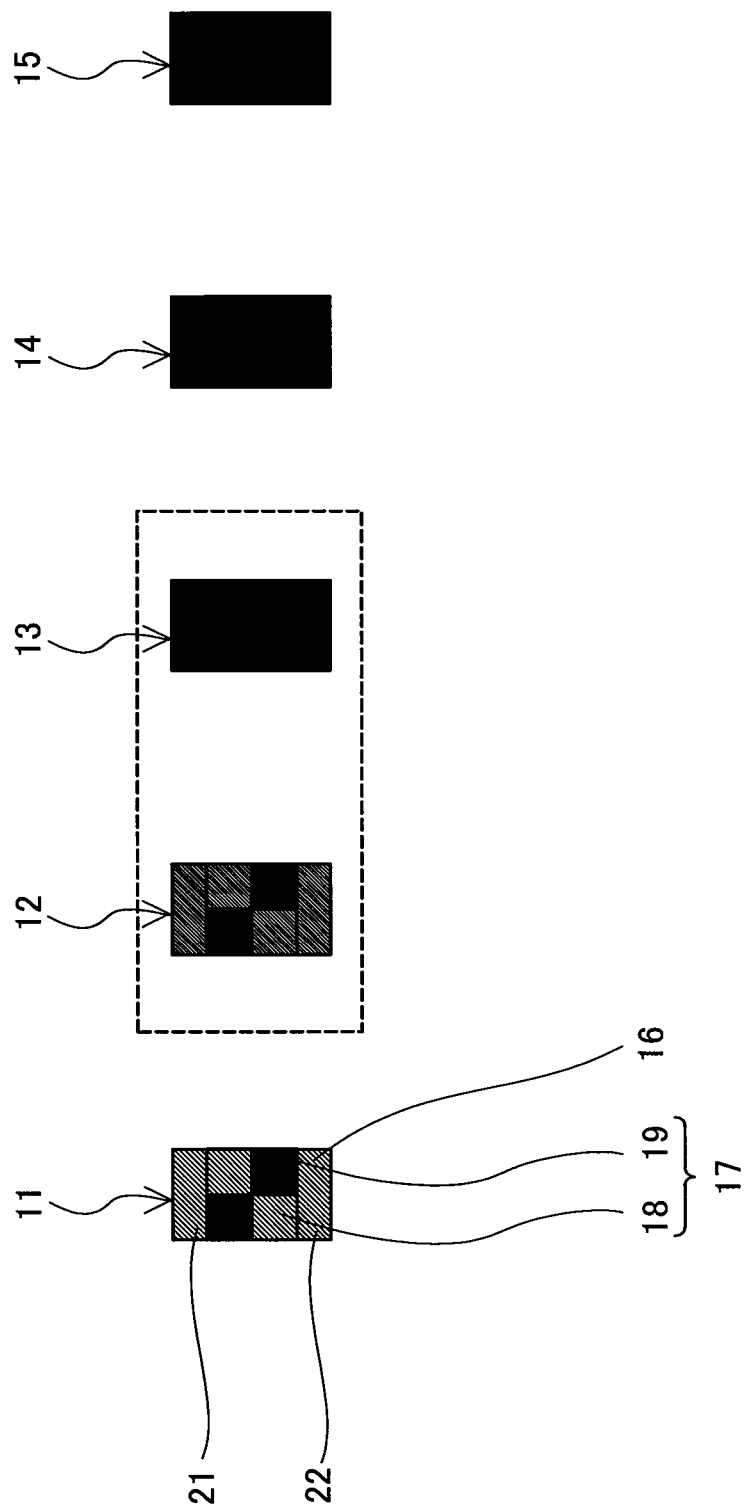
FIG. 6 is a schematic view for explaining an evaluation step.

FIG. 6 is a schematic view for explaining the evaluation step S50. As surrounded by a dashed line in FIG. 6, the second black-and-white hiding testing material 12 through which the black-and-white pattern is seen and the third black-and-white hiding testing material 13 through which the black-and-white pattern is not seen are selected as a pair. The after-curing film thickness value of the third black-and-white hiding testing material 13 belonging to the pair and making the black-and-white pattern invisible is determined to be an evaluation result. Specifically, in the present embodiment, the third black-and-white hiding testing material 13 is critical chart at which a boundary between the white cell section 18 and the black cell section 19 is invisible. Thus, an evaluation result, namely, a "black-and-white hiding film thickness value" showing an evaluation value of black-and-white hiding power is 1.0 μm corresponding to the after-curing film thickness value of the third black-and-white hiding testing material 13. As a result, in the present embodiment, the black-and-white hiding film thickness value falls within the standard and the coating may be determined to conform to the standard. Detailed environmental conditions for the above-described curing step S40 and evaluation step S50 are changed, if appropriate, in response to a definition determined in advance.

(1) According to a conventional method given as a comparative example, a thickness level difference is formed by dividing one piece of black-and-white chart into a plurality of sections, applying a coating repeatedly to each section while a masking plate is moved from one section to another, and forming coating films sequentially on the sections in order of reducing thickness of the coating film, for example. In comparison to such a method of the comparative example, in the stepwise coating application step S30 in the above-described method of testing hiding power of the first embodiment, the uniform coating application step S31 and the exclusion step S33 are performed repeatedly, and the coating is applied uniformly to the flat coating surface entirely in the uniform coating application step S31. Namely, this eliminates the need for applying the coating to a stepped surface to provide stabilized accuracy in the coating application, making it possible to improve evaluation accuracy.

(2) According to the above-described conventional method, it is technically difficult to form a considerably small thickness level difference of about 0.2 μm between corresponding ones of the black-and-white hiding testing materials 11, 12, 13, 14, and 15. However, according to the method of the first embodiment, formation of such a thickness level difference is feasible to allow evaluation even on a high hiding power coating having a black-and-white hiding film thickness value of about 1.0 μm or about 1.4 μm (generally, a film thickness value of equal to or less than 2.0 μm).

(3) According to the above-described method of testing hiding power of the first embodiment, the film thickness value acquisition step S32 is performed before the curing step S40 to measure a before-curing thickness with the wet gauge. Thus, during implementation of the stepwise coating application step S30, even if a measured value differs significantly from a target film thickness value due to coating application failure, this problem becomes known before implementation of the curing step S40 to allow re-implementation of the step readily. Specifically, working efficiency may be improved.

(4) According to the above-described method of testing hiding power of the first embodiment, the film thickness level difference is constantly 0.2 μm. Specifically, this method makes it possible to form the black-and-white hiding testing materials 11, 12, 13, 14, and 15 with coating films having the constant film thickness level difference and having gradation levels differing at substantially equal intervals. As the gradation level does not change suddenly between the continuous black-and-white hiding testing materials 11, 12, 13, 14, and 15 in order of coating film thickness, a critical black-and-white hiding testing material is identified easily in the evaluation step S50 at which the black-and-white pattern is invisible, thereby improving evaluation accuracy.

B. Second Embodiment

Figure 7:
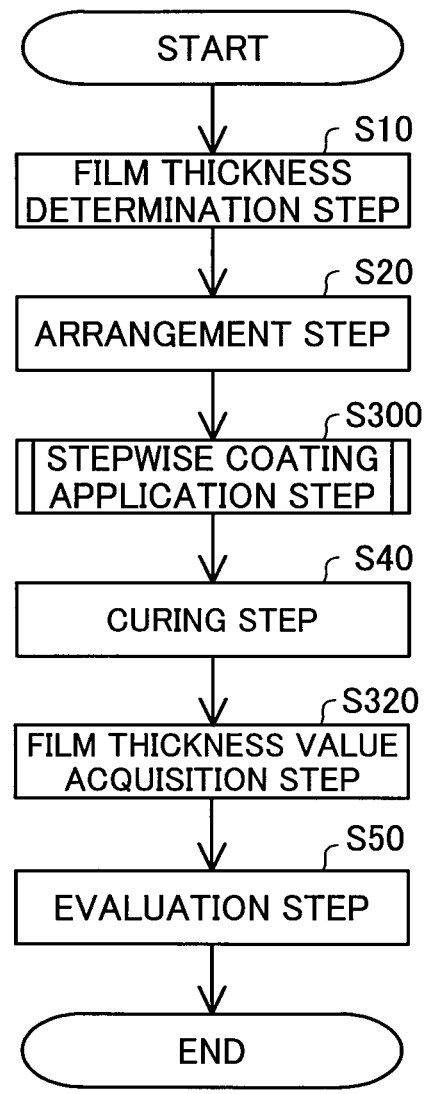
FIG. 7 is a main flowchart explaining a method of testing the hiding power of a coating according to a second embodiment of the present disclosure.
Figure 8:
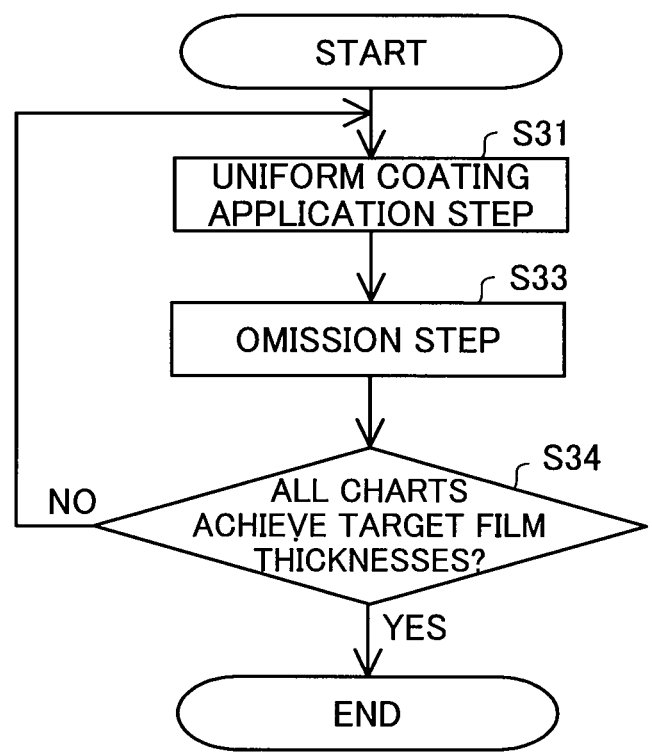
FIG. 8 is a flowchart explaining a stepwise coating application step.

A method of testing the hiding power of a coating according to a second embodiment of the present disclosure will be described by referring to FIGS. 7 and 8. FIG. 7 is a main flowchart explaining the method of testing the hiding power of a coating according to the second embodiment of the present disclosure. FIG. 8 is a flowchart explaining a stepwise coating application step. Black-and-white hiding testing materials 11, 12, 13, 14, and 15 used in the second embodiment are the same as those used in the first embodiment. The second embodiment mainly differs from the first embodiment in that a film thickness is not measured before curing using the wet gauge but is measured after the curing. Only the difference from the first embodiment will be described while description of steps similar to those of the first embodiment will be omitted. In FIGS. 7 and 8, a step similar to that of the first embodiment is given the same number.

As shown in FIG. 7, a film thickness value acquisition step S320 is performed after the curing step S40. In the film thickness value acquisition step S320, the after-curing film thickness of each of the black-and-white hiding testing materials 11, 12, 13, 14, and 15 is measured using an electromagnetic film thickness gauge. In response to this, in a stepwise coating application step S30 shown in FIG. 8, the film thickness value acquisition step S32 (FIG. 2) is not performed but the exclusion step S33 is performed after the uniform coating application step S31. In the second embodiment, the black-and-white hiding testing material 11, 12, 13, 14, or 15 at which a before-curing film thickness value conforms to a target film thickness value is identified in the exclusion step S33 on the basis of the number of times a coating is applied. This also applies to S34 in which it is judged whether all the black-and-white hiding testing materials 11, 12, 13, 14, and 15 have their before-curing film thickness values conforming to their target film thickness values.

According to the second embodiment, effects comparable to the above-described effects (1), (2), and (4) of the first embodiment are fulfilled.

C. Other Embodiments (C1) Regarding the black-and-white hiding testing materials 11, 12, 13, 14, and 15 of each of the above-described embodiments, one square forming the black-and-white checkered pattern has a size of about 50 mm. However, the numerical value of this size may be changed, if appropriate, within a range from about 40 to about 80 mm that facilitates the visual inspection in the evaluation step S50. Regarding the number of cells forming the black-and-white checkered pattern, it is not limited to two cells by two cells in two rows like in each of the above-described embodiments but it may be two cells in one row. Additionally, as long as the black-and-white pattern is such that a boundary between black and white is recognizable during evaluation, the shape or lightness of the pattern, other conditions, etc. may be changed, if appropriate.

(C2) In the above-described first embodiment, in the film thickness value acquisition step S32 performed before the curing step S40, an after-curing film thickness is acquired by multiplying a before-curing film thickness value by a heating residue. Alternatively, only a before-curing film thickness value may be measured before curing using the wet gauge and an after-curing film thickness may be calculated in the evaluation step S50.

(C3) In the uniform coating application step S31 of each of the above-described embodiments, coating application is started from the first black-and-white hiding testing material 11 of a small target film thickness value. Alternatively, the coating application may be started from a black-and-white hiding testing material of a large target film thickness value. As long as the coating is applied with a uniform thickness to the black-and-white hiding testing materials 11, 12, 13, 14, and 15 as coating objects, the coating application routes R1, R2, and R3 may also be changed, if appropriate.

(C4) In the exclusion step S33 of each of the above-described embodiments, the black-and-white hiding testing material 11, 12, 13, 14, or 15 to be excluded is removed from the base plate 23. However, as long as this black-and-white hiding testing material is excluded from an object of coating application in the uniform coating application step S31 to be performed next, it may remain attached to the base plate 23, for example. This may be achieved by arranging a masking plate at a boundary between a black-and-white hiding testing material of a film thickness conforming to its target film thickness value (first black-and-white hiding testing material 11, for example) and a black-and-white hiding testing material of a film thickness not conforming to its target film thickness value (second to fifth black-and-white hiding testing materials 12, 13, 14, 15, for example) (this boundary may be between the first black-and-white hiding testing material 11 and the second black-and-white hiding testing material 12, for example) so as to prevent adherence of dust of the coating to the black-and-white hiding testing material of the film thickness already at the target film thickness value.

(C5) In the above-described second embodiment, the film thicknesses of all the black-and-white hiding testing materials 11, 12, 13, 14, and 15 are measured using the electromagnetic film thickness gauge before implementation of the evaluation step S50. Alternatively, only a pertinent black-and-white hiding testing material (in the example of the above-described second embodiment, the third black-and-white hiding testing material 13) extracted in the evaluation step S50 may be subjected to measurement of an after-curing film thickness.

(C6) While a target film thickness value is set on the basis of an after-curing film thickness in each of the above-described embodiments, it may be set on the basis of a before-curing film thickness.

(C7) While the coating is applied manually with the spray gun in the stepwise coating application step in each of the above-described embodiments, it may alternatively be applied by a robot or using a die coater.

The present disclosure is not limited to each of the foregoing embodiments but is feasible in various configurations within a range not deviating from the substance of the present disclosure. For example, technical features in each of the embodiments corresponding to those in each of the aspects described in SUMMARY may be replaced or combined, where appropriate, with the intention of solving some or all of the aforementioned problems or achieving some or all of the aforementioned effects. Unless being described as absolute necessities in this specification, these technical features may be deleted, where appropriate. The present disclosure may be realized in the following aspects, for example.

[1] According to one aspect of the present disclosure, a method of testing the hiding power of a coating is provided. This method of testing the hiding power of the coating is a method of testing the hiding power of a coating using a plurality of black-and-white hiding testing materials each having a black-and-white pattern. The method includes: applying the coating to the plurality of black-and-white hiding testing materials without the applied coating in which the number of times of the coating is changed depending on the black-and-white hiding testing materials so as to achieve target film thickness values differing stepwise; curing the coating applied to the plurality of black-and-white hiding testing materials; and evaluating the black-and-white hiding power of the coating by comparing the plurality of black-and-white hiding testing materials with each other obtained by the curing.

According to the method of testing the hiding power of the coating of the above-described aspect, in the applying the coating, the coating is applied to the plurality of black-and-white hiding testing materials without the applied coating in which the number of times of the coating is changed stepwise depending on the black-and-white hiding testing materials so as to achieve target film thickness values differing stepwise. This stabilizes accuracy in the applying the coating compared to a configuration of forming coating films of thicknesses differing stepwise on a single surface of one piece of chart, making it possible to improve evaluation accuracy.

[2] In the above-described aspect, the applying the coating may include: applying a uniform coating to a black-and-white hiding testing material as an object to a thickness uniform in the plurality of black-and-white hiding testing materials, the black-and-white hiding testing material as the object belonging to the plurality of black-and-white hiding testing materials and having a before-curing film thickness value not having reached a value corresponding to the target film thickness value, the before-curing film thickness value showing the thickness of the coating on the black-and-white hiding testing material before the curing; and excluding the black-and-white hiding testing material from an object of next of the applying the uniform coating if the before-curing film thickness value of the black-and-white hiding testing material has reached the value corresponding to the target film thickness value. The applying the uniform coating and the excluding may be performed repeatedly until the before-curing film thickness value of each of the black-and-white hiding testing materials except the black-and-white hiding testing material excluded from the object in the excluding reaches the value corresponding to the target film thickness value.

According to the method of testing the hiding power of the coating of the above-described aspect, in the applying the coating, the applying the uniform coating and the excluding are performed repeatedly. This allows formation of black-and-white hiding testing materials sequentially in order of increasing target film thickness value at which the before-curing film thickness values have reached values corresponding to the target film thickness values.

[3] In the above-described aspect, the evaluating may include: identifying a critical black-and-white hiding testing material at which a boundary between a white section and a black section in the black-and-white pattern is invisible by comparing two of the plurality of black-and-white hiding testing materials with each other after the curing between which the target film thickness values are at levels next to each other; acquiring an after-curing film thickness value showing the thickness of the coating on the identified critical black-and-white hiding testing material; and determining the acquired after-curing film thickness value to be a black-and-white hiding film thickness value showing an evaluation value of the black-and-white hiding power.

According to this aspect, the critical black-and-white hiding testing material is identified at which the boundary between the white section and the black section in the black-and-white pattern is invisible, and the after-curing film thickness value of the identified black-and-white hiding testing material is determined to be the black-and-white hiding film thickness value. This makes it possible to evaluate the black-and-white hiding power of the coating correctly as a numerical value.

[4] In the above-described aspect, the applying the coating may include: applying a uniform coating to a black-and-white hiding testing material as an object to a thickness uniform in the plurality of black-and-white hiding testing materials, the black-and-white hiding testing material as the object belonging to the plurality of black-and-white hiding testing materials and having a before-curing film thickness value not having reached a value corresponding to the target film thickness value, the before-curing film thickness value showing the thickness of the coating on the black-and-white hiding testing material before implementation of the curing step; measuring the before-curing film thickness value of the black-and-white hiding testing material after the applying the uniform coating; and excluding the black-and-white hiding testing material from an object of next of the applying the uniform coating if the before-curing film thickness value of the black-and-white hiding testing material has reached the value corresponding to the target film thickness value by comparing the measured before-curing film thickness value and the value corresponding to the target film thickness value with each other. The applying the uniform coating, the measuring, and the excluding may be performed repeatedly until the before-curing film thickness value of each of the black-and-white hiding testing materials except the black-and-white hiding testing material excluded from the object in the excluding reaches the value corresponding to the target film thickness value. The acquiring may include calculating the after-curing film thickness value by multiplying the before-curing film thickness value measured in the measuring by a heating residue determined in advance by a test conducted beforehand and showing the ratio of a solid remaining as a coating film after baking of the coating.

According to this aspect, if a difference from the target film thickness value is caused due to coating application failure in the applying the coating, this becomes known before the curing to allow re-implementation of the step readily.

[5] In the above-described aspect, the target film thickness values may differ stepwise with an equal interval between the black-and-white hiding testing materials. According to this aspect, the target film thickness values differ stepwise with the equal interval between the plurality of black-and-white hiding testing materials. Specifically, it is possible to form black-and-white hiding testing materials with coating films having a constant film thickness level difference and having gradation levels differing at substantially equal intervals. As the gradation level does not change suddenly between the continuous black-and-white hiding testing materials in order of coating film thickness, a critical black-and-white hiding testing material is identified easily in the evaluation step at which the black-and-white pattern is invisible, thereby improving evaluation accuracy.

What is claimed is:

1. A method of testing the hiding power of a coating using a plurality of black-and-white hiding testing materials each having a black-and-white pattern, comprising:
    arranging the plurality of black-and-white hiding testing materials side by side paced substantially equal to each other;
    applying the coating to the plurality of black and white hiding testing materials, altering the number of times of the coating for each black-and-white hiding testing material such that film thickness values of the plurality of black-and-white hiding testing materials are different stepwise;
    curing the coating applied to the plurality of black-and-white hiding testing materials; and
    evaluating the black-and-white hiding power of the coating by comparing each of the plurality of black-and-white hiding testing materials with other of the plurality of black-and-white hiding testing materials
    wherein the coating includes:
    applying a uniform coating to at least one of the plurality of black-and-white hiding testing materials as an object to a thickness uniform in the plurality of black-and-white hiding testing materials having a before-curing film thickness value that has not reached a value corresponding to a target film thickness value, the before-curing film thickness value showing the thickness of the coating on the black-and-white hiding testing material before the curing; and
    excluding the black-and-white hiding testing material from an object of subsequent applying the uniform coating if the before-curing film thickness value of the black-and-white hiding testing material has reached the value corresponding to the target film thickness value, and
    the applying the uniform coating and the excluding are performed repeatedly until the before-curing film thickness value of each of the black-and-white hiding testing materials reaches the value corresponding to the target film thickness value.

2. The method of testing the hiding power of the coating according to claim 1, wherein the evaluating includes:
    identifying a critical black-and-white hiding testing material at which a boundary between a white section and a black section in the black-and-white pattern is invisible by comparing two of the plurality of black-and-white hiding testing materials with each other, the two of the plurality of black-and-white hiding testing materials having the target film thickness values at levels next to each other;
    acquiring an after-curing film thickness value showing the thickness of the coating on the identified critical black-and-white hiding testing material; and
    determining the acquired after-curing film thickness value to be a black-and-white hiding film thickness value showing an evaluation value of the black-and-white hiding power.

3. The method of testing the hiding power of the coating according to claim 2, wherein
    the applying the coating includes:
    applying a uniform coating to at least one of the plurality of black-and-white hiding testing materials having a before-curing film thickness value that have not reached a value corresponding a target film thickness value, the before-curing film thickness value showing the thickness of the coating on the black-and-white hiding testing material before the curing;
    measuring the before-curing film thickness value of at least one of the plurality of the black-and-white hiding testing material after the applying the uniform coating; and
    excluding the black-and-white hiding testing material from an object of subsequent applying the uniform coating if the before-curing film thickness value of at least one of the plurality of the black-and-white hiding testing material has reached the value corresponding to the target film thickness value by comparing the measured before-curing film thickness value and the value corresponding to the target film thickness value with each other, the plurality of the black-and-white hiding testing materials reaches the value corresponding to the target film thickness value, and the acquiring includes:

calculating the after-curing film thickness value by multiplying the before-curing film thickness value measured in the measuring by a heating residue determined in advance by a test conducted beforehand and showing the ratio of a solid remaining as a coating film after baking of the coating.

4. The method of testing the hiding power of the coating according to claim 1, wherein the target film thickness values differ stepwise with an equal interval between the plurality of black-and-white hiding testing materials.

* * * * *